United States Patent
Høydal et al.

(10) Patent No.: US 12,129,824 B2
(45) Date of Patent: Oct. 29, 2024

(54) METHOD FOR INSTALLING AN OFFSHORE WIND TURBINE AND A SUBSTRUCTURE FOR AN OFFSHORE WIND TURBINE

(71) Applicant: National Oilwell Varco Norway AS, Kristiansand S (NO)

(72) Inventors: Oddvar Høydal, Søgne (NO); Thor Lars Ludvig Strand, Kristiansand (NO); Boro Barjaktarovic, Kristiansand S (NO)

(73) Assignee: Grant Prideco, Inc., Houston, TX (US)

( * ) Notice: Subject to any disclaimer, the term of this patent is extended or adjusted under 35 U.S.C. 154(b) by 890 days.

(21) Appl. No.: 17/278,078

(22) PCT Filed: Sep. 24, 2019

(86) PCT No.: PCT/NO2019/050194
§ 371 (c)(1),
(2) Date: Mar. 19, 2021

(87) PCT Pub. No.: WO2020/067904
PCT Pub. Date: Apr. 2, 2020

(65) Prior Publication Data
US 2021/0348596 A1    Nov. 11, 2021

(30) Foreign Application Priority Data

Sep. 24, 2018  (NO) .................................. 20181239

(51) Int. Cl.
*F03D 13/10*      (2016.01)
*B63B 35/44*      (2006.01)
(Continued)

(52) U.S. Cl.
CPC .............. *F03D 13/10* (2016.05); *B63B 35/44* (2013.01); *B63B 75/00* (2020.01); *F03D 13/25* (2016.05);
(Continued)

(58) Field of Classification Search
CPC ......... B63B 75/00; B63B 35/44; F03D 13/25; F03G 13/10
See application file for complete search history.

(56) References Cited

U.S. PATENT DOCUMENTS 9,394,035 B2 *  7/2016  Dagher .................... B63B 75/00
9,523,355 B2 * 12/2016  Taub ....................... E02B 17/02
(Continued)

FOREIGN PATENT DOCUMENTS

EP    3170730 B1 *  6/2019  ............. B63B 21/20
EP    3933192 A1 *  1/2022  ............. B63B 39/00
(Continued)

OTHER PUBLICATIONS

International Search Report for PCT/NO2019/050194 dated Dec. 17, 2019 (3 pages).
(Continued)

*Primary Examiner* — S. Joseph Morano
*Assistant Examiner* — Jovon E Hayes
(74) *Attorney, Agent, or Firm* — Conley Rose, P.C.

(57) ABSTRACT

A method of installing an offshore wind turbine includes the step of raising a full-length tower for the offshore wind turbine by moving it longitudinally from a container in a substructure, the substructure being a support structure for the wind turbine, wherein the substructure is arranged with a container configured for housing a tower for the wind turbine substantially in its entirety.

25 Claims, 9 Drawing Sheets

(51) Int. Cl.
    *B63B 75/00* (2020.01)
    *F03D 13/25* (2016.01)

(52) U.S. Cl.
    CPC ... *B63B 2035/442* (2013.01); *B63B 2035/446* (2013.01); *F05B 2240/93* (2013.01); *F05B 2240/95* (2013.01)

(56) References Cited

U.S. PATENT DOCUMENTS

| | | | |
|---|---|---|---|
| 2004/0169376 A1* | 9/2004 | Ruer | E02D 27/425 |
| | | | 290/55 |
| 2011/0214596 A1* | 9/2011 | Wang | B63B 21/60 |
| | | | 114/265 |
| 2012/0201217 A1 | 8/2012 | Malladi | |
| 2018/0170488 A1* | 6/2018 | Fernandez Gomez | |
| | | | B63B 21/20 |
| 2021/0039755 A1* | 2/2021 | Sirnivas | B63B 1/107 |
| 2023/0020149 A1* | 1/2023 | Madsen | F03D 13/25 |

FOREIGN PATENT DOCUMENTS

| | | | | |
|---|---|---|---|---|
| GB | 2365905 | 2/2002 | | |
| GB | 2378679 | 2/2003 | | |
| GB | 2451191 | 1/2009 | | |
| GB | 2460551 | 12/2009 | | |
| JP | 2012-201217 | 10/2012 | | |
| JP | 2012201217 A * | 10/2012 | | |
| WO | WO-2020067904 A1 * | 4/2020 | ............ | B63B 1/048 |

OTHER PUBLICATIONS

Written Opinion for PCT/NO2019/050194 dated Dec. 17, 2019 (5 pages).
Extended Norwegian Search Report for No. 20181239 dated Apr. 23, 2019 (2 pages).
J Way, H Bowerman, Integrated Installation for Offshore Wind Turbines, ETSU W/61/00617/00/REP, DTI (152 pages).
Korovkin, Pavel, Subsea technology, Mobile Offshore Wind Turbine (unpublished master's thesis), University of Stavanger.
English Abstract JP2012201217.

* cited by examiner

Fig. 9

METHOD FOR INSTALLING AN OFFSHORE WIND TURBINE AND A SUBSTRUCTURE FOR AN OFFSHORE WIND TURBINE

CROSS REFERENCE TO RELATED APPLICATIONS

This application is a 35 U.S.C. § 371 national stage application of PCT/NO2019/050194 filed Sep. 24, 2019 and entitled "A Method for Installing an Offshore Wind Turbine and a Substructure for an Offshore Wind Turbine", which claims priority to Norwegian Patent Application No. 20181239 filed Sep. 24, 2018, each of which is incorporated herein by reference in their entirety for all purposes.

STATEMENT REGARDING FEDERALLY SPONSORED RESEARCH OR DEVELOPMENT

Not application

FIELD OF DISCLOSURE

The present disclosure relates to the field of offshore wind turbines, and in particular to the field of installation of offshore wind turbines. It relates to a substructure arranged with a container configured for housing a tower for an offshore wind turbine substantially in its entirety and a method of installing an offshore wind turbine.

BACKGROUND

Wind energy is becoming increasingly important as the world moves towards renewable, "green" energy. To harvest this energy, it is desirable to construct wind farms offshore rather than onshore, as the quality and speed of wind is typically greater offshore than onshore.

Offshore wind turbines (OWTs) are used to harvest wind energy offshore. OWTs typically comprise four main components: a foundation, a tower, a generator and a rotor. The generator typically comprises parts such as an electrical generator, control electronics, gear box, and more, and is the component that generates electrical energy from rotational energy. The rotor comprises blades, which turns wind energy into rotational energy. Some parts of the generator may be housed by the tower, some by a nacelle, and some parts belonging to the rotor may be housed by the nacelle.

Whereas offshore wind energy historically has mostly been harvested in shallow waters, advancements in technology facilitates for harvesting of energy in areas with deeper water. Furthermore, wind turbines have increased in size to harvest energy more efficiently. With the increased depths of water and sizes of wind turbines, it has become increasingly challenging to install the wind turbines offshore. Huge, dedicated offshore wind turbine-installing vessels have been developed and built for the purpose. These huge vessels are very expensive to use, may be in low supply, and it may be difficult or impossible to use them in certain waters, such as in big lakes, e.g. due to restrictions or accessibility.

Installing an offshore wind turbine can be extremely challenging. Known installation procedures typically involve establishing a foundation, raising or erecting a tower on the foundation, and subsequently installing a nacelle and blades atop the erect tower. Particularly challenging is the installation of the nacelle and blades atop a raised tower offshore, because of the combination of great height, very heavy equipment and relative movement between the tower and the installation vessel.

An object of the disclosure is to remedy or to reduce at least one drawback of prior art.

SUMMARY OF THE DISCLOSURE

According to a first aspect of the disclosure, there is provided a method of installing an offshore wind turbine, the method comprising the step of:

raising a full-length tower for the offshore wind turbine by moving it longitudinally from a container in a substructure, the substructure being a support structure for the wind turbine.

Raising the tower longitudinally from a substructure may be a highly advantageous method of raising a tower for a wind turbine as it may simplify an installation procedure and reduce the need for large vessels.

The step of raising the tower may be performed by use of a device for moving the tower longitudinally. The tower may e.g. be moved longitudinally by jacking, by hoisting, by pulling, by use of buoyancy, by driving and/or by pushing the tower upwards. The device may typically be provided at the top of the substructure, and/or inside the container. The device may be fixed to the substructure and connected to the tower. An example is a winch provided at the top of the substructure, above the top of the container, wherein a hoisting cable of the winch is connected to a connection means at the bottom of the tower. By using the winch to pull in the cable, the tower may be moved longitudinally.

The device for moving the tower longitudinally may be used both for lowering the tower and for raising the tower. This may be beneficial e.g. for decommissioning and/or maintenance, in addition to the benefits related to installation.

The method may comprise the step of transporting the substructure for the offshore wind turbine to a location for installation of the wind turbine. The step of transporting the substructure may be performed by way of towing the substructure. While towing, the substructure may be oriented such that it has its longitudinal axis substantially horizontally. This may reduce the forces acting on the substructure by the water and make the transporting of the substructure more efficient with regard to time and/or energy consumption. The substructure may then need to be rotated approximately 90° at the installation site before anchoring and further installation steps may commence. Alternatively, the substructure may be towed with its longitudinal axis oriented vertically, whereby the substructure is already provided in its upright position, whereby anchoring of the substructure may commence immediately when the substructure arrives at the installation site. The step of transporting may be performed by carrying the substructure, e.g. by a vessel. Towing of the substructure may be performed having the substructure in an angle somewhere between what can be called substantially horizontal and substantially vertical.

The method may comprise the step of inserting the tower into the container of the substructure. This may be done by floating, e.g. by help of a barge, the tower into the tower into the container. Alternatively, the tower may be lifted and lowered into the container. The tower may be e.g. pushed, pulled and/or driven into the container.

The method may comprise the step of installing a nacelle and/or one or more blades to the top of the tower, wherein the step of installing the nacelle and the one or more blades is performed prior to fully raising the tower. By allowing for installation of a nacelle and/or blades before fully raising the tower, the installation may be performed closer to the sea level. Typically, the top of the tower may protrude slightly from the top of the container, such as approximately one, two, three, four, five or six meters from the top of the container, for the installation of the nacelle and. The top of the container may at this point typically be at approximately five, ten, fifteen or twenty meters above sea level. The installation of the nacelle and/or the one or more blades may thus be performed at a height above the sea level that is the height the tower protrudes above the top of the container plus the height of the top of the tower above the sea level. An installation at such a height may typically be less demanding with regards to equipment need and complexity of the installation procedure than an installation at a height of a fully raised tower standing on a foundation (a fully raised tower may extend more than 100 metres above the sea level). There may e.g. not be a need for a crane that can lift heavy equipment to great heights, and the complexity may be reduced e.g. because of less relative movement between the top of the tower and a vessel carrying equipment to be installed.

The method may comprise the step of bringing the tower into an intermediary position by moving it longitudinally from a lowermost position prior to the installation of the nacelle and/or one or more blades. Raising the tower from a lowermost position may in some cases be advantageous. If the tower in its entirety is housed in the container, raising the tower may be necessary. Raising the tower to an intermediary position may be necessary or at least beneficial for installation of one or more blades, in particular for the installation of a third blade.

The method may comprise the step of locking the tower into a position by use of a locking mechanism, wherein said position may be a lowermost position, an uppermost position or an intermediary position, wherein the intermediary position is a position between the lowermost position and the uppermost position.

The method may comprise the step of upending the substructure prior to raising the tower. Upending the tower prior to raising the tower may be necessary and/or beneficial, e.g. if the tower has been towed to position while having its longitudinal axis oriented substantially horizontally. The substructure may be upended in other ways, such as by tilting it mechanically e.g. by use of a gripping mechanism that may enforce a rotational force or by pulling the substructure to enforce a rotation by use of mooring lines.

The step of upending the substructure may be performed by ballasting. The substructure may comprise a compartment for receiving ballast, typically in a bottom end portion of the substructure, so as to increase the weight of said bottom end. Changing the weight of the content of the compartment may alter the weight distribution in the substructure and may be used to adjust the orientation of the substructure in the water.

Furthermore, the method may comprise the step of anchoring the substructure to a seabed. Anchoring may be performed by connecting the substructure by use of mooring lines to a mooring device installed on or in the seabed. The method may also include the step of installing the mooring device on or in the seabed.

The method may further comprise the step of lifting a load, such as a nacelle or a blade, by use of a load-carrying device. The substructure may comprise the load-carrying device. A nacelle or a blade, or other equipment to be lifted onto the substructure and/or tower may be delivered to the substructure by use of a transporter, such as a vessel, and may be picked up from the transporter by use of the load-carrying device. The load-carrying device may comprise a crane and/or a frame, and/or may be tiltable.

According to a second aspect of the disclosure, there is provided a substructure for an offshore wind turbine, wherein the substructure is arranged with a container configured for housing a tower for the wind turbine substantially in its entirety.

The substructure according to the second aspect of the disclosure may be the substructure referred to above, the substructure used in the method according to the first aspect of the disclosure. The substructure referred to above, may comprise any of the features described in the description of the second aspect of the disclosure.

Note that "substantially in its entirety" may include "in its entirety": meaning that the entirety of the tower, the full length of the tower, may be housed in the container. It may also include that only a majority of the tower may be housed in the container, such as e.g. approximately 80% of the length of the tower, approximately 85% of the length of the tower, approximately 90% of the length of the tower, approximately 95% of the length of the tower and/or approximately 98% of the length of the tower.

Having the substructure house the tower may be beneficial for transportation of the wind turbine to a position for installation, as the two parts may be transported as one, e.g. by towing. In addition, having the substructure house the tower may be advantageous with regards to the installation. Raising the tower from within the substructure, e.g. by moving it longitudinally into a standing position, may be significantly less complex and may carry less risk of an accident than e.g. mounting a full-length separate tower onto a substructure offshore. Furthermore, raising the tower in such a manner may be less demanding in terms of e.g. size of vessel needed for an installation. Furthermore, a greater part of a procedure of assembly of the wind turbine may be performed at shore, reducing the work having to be performed offshore.

The container may be a container that is open in an end. The container may typically be substantially cylindrical. However, the container may of course have another shape, such as a conical shape or a cuboid shape. The container may be open in one end, and/or it may be open in two ends. The container may be below an upper or top surface of the substructure, such that the tower may be held in its full length with substantially the entirety of the tower below said upper or top surface of the substructure.

The substructure may be a floating substructure for a floating wind turbine. It may e.g. be a spar buoy. Having a floating substructure may be advantageous, particularly in deep-water areas.

The substructure may have a substantially vertical longitudinal axis when the substructure is in its upright, operational position. The container may be a deep, substantially cylinder-shaped, container. The container may have a longitudinal axis substantially parallel with the longitudinal axis of the substructure. The longitudinal axis of the container may be substantially aligned with the longitudinal axis of the substructure. Other shapes and configurations of the container may be possible.

The substructure may comprise a device for moving the tower longitudinally. The device for moving the tower may be a jacking device, a hoisting device, a pulling device, a driving device or a pushing device. Having a device for moving the tower longitudinally is beneficial for facilitating moving the tower longitudinally. Moving the tower longitudinally may be advantageous as it may facilitate for a less complex installation procedure, reduce the risk of accidents, and/or reduce the size of vessel needed for installation of the wind turbine.

The substructure may comprise a compartment for ballast. It may comprise a plurality of compartments for ballast.

The substructure may be upendable by ballasting. Upending the substructure by ballasting may be more efficient and less demanding in terms of equipment, material and/or vessel needed for upending the substructure. Furthermore, ballasting may advantageously be used to stabilize the substructure in the water. The substructure may be configured to be transportable by towing having its longitudinal axis substantially horizontally. It may also be transportable by towing having its vertical axis substantially vertically. Having the longitudinal axis substantially horizontally during transportation, may advantageously facilitate more efficient towing in terms of speed and energy consumption. If it is to be towed having its longitudinal axis substantially vertically, installation of nacelle and blades may be performed onshore or near shore prior to towing to position.

The substructure may comprise a tower for an offshore wind turbine. The substructure may comprise one or more sections of a tower for an offshore wind turbine.

The substructure may comprise a locking mechanism for locking the tower into a position. This may be necessary or at least advantageous for locking the tower in a position, such as in a lowermost position, a fully raised position, and/or an intermediary position.

The substructure may comprise a load-carrying device for carrying a load. The load-carrying device may be tiltable and/or be configured to carry a load from a vessel onto the substructure. Having a load-carrying device on the substructure may be advantageous as it may limit the time of two floating structures co-working, and thus reduces complications caused by excessive relative movement between the two structures.

The load-carrying device may be e.g. an A-frame or a crane. It may be installed onto the substructure during an onshore mobilization, prior to transportation of the substructure to position for installation of the wind turbine. This may be beneficial, as it may limit the time, material and/or manpower needed for installation offshore.

The substructure may comprise a guiding means for guiding the tower in the container as the tower is moved longitudinally. The guiding means may comprise e.g. a roller, a belt and/or a sliding plate. The substructure may comprise a plurality of guiding means.

The guiding means may be configured to guide a moving structure of varying diameter. The guiding means may comprise means for geometric adaption, such as a telescopic element, a spring-biased mechanism or another resilient member, to facilitate for sufficient support of a moving structure having an uneven radius along its length. The tower may have an uneven radius along its length, such as a conical shape, and having guiding means comprising means for geometric adaptation may thus be advantageous or even necessary to provide sufficient support for the tower as it is moved longitudinally in the container.

One or more guiding means may be fixed to e.g. a wall of the container in the substructure or a top section of the substructure, and/or one or more guiding means may be fixed to the tower. Having a guiding means fixed to the substructure means there will be support for the tower at a given height in and/or on the substructure. Having guiding means fixed to the tower means there will be support for the tower at a given height of the tower. It may be particularly advantageous to combine guiding means fixed to the top of the substructure with guiding means fixed to the bottom of the tower, to secure support at a lowest point of the tower in the container and at an upper point of contact between the tower and the substructure at any given time during a raising or lowering of the tower.

One or more guiding means may be attached to a top portion, a middle portion or a bottom portion of the wall of the container in the substructure. One or more guiding means maybe attached to a lower portion of the tower, a middle portion of the tower or an upper portion of the tower.

There is further described a substructure configured to act as a base for an offshore wind turbine, wherein the substructure is configured to hold a tower for the offshore wind turbine in its entirety, and to move the tower longitudinally up and/or down. When in its lowermost position, the tower, held by the substructure, may be held with substantially the entirety of the length of the tower be-low an upper surface of the substructure. The upper surface may be a deck of the substructure. The substructure may be a floating substructure, or it may be a non-floating substructure. The substructure may be shaped like a spar buoy or have any other shape suitable for the purpose of acting as a base for and support for an offshore wind turbine. The substructure may, e.g. be configured like a floating offshore platform or a non-floating offshore platform, like a monopod platform, a tripod platform, a platform with four legs, or have any other configuration suitable for the purpose.

BRIEF DESCRIPTION OF THE DRAWINGS

In the following is described exemplary embodiments illustrated in the accompanying drawings, wherein.

DETAILED DESCRIPTION OF THE DISCLOSED EXEMPLARY EMBODIMENTS

Note that the embodiments illustrated in the drawings are shown highly simplified and schematic, and that various features are not necessarily drawn to scale. Identical reference numerals refer to identical or similar features in the drawings.

Figure 1:
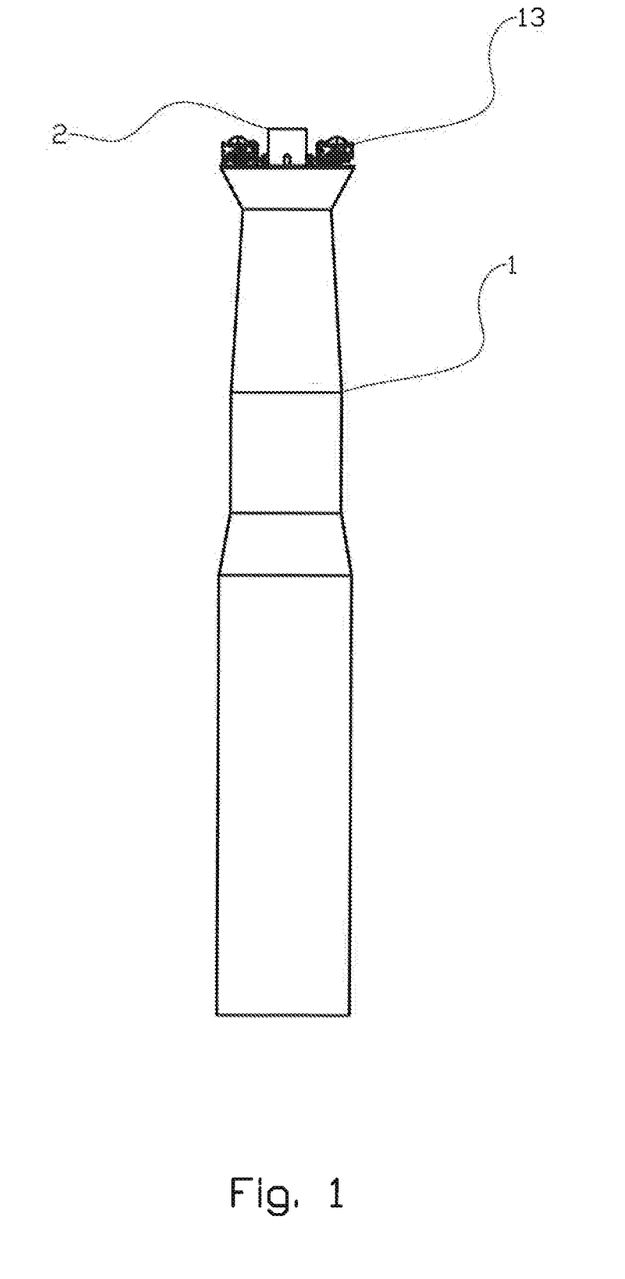
FIG. 1 shows a side view of an embodiment of the substructure comprising a full-length tower in the container of the substructure.

FIG. 1 shows a substructure 1 according to the second aspect of the disclosure, in its upright, operational position. The substructure 1 comprises a tower 2, housed inside a container (not shown) in the substructure 1. At the top of the substructure 1, the top of the tower 2 can be seen protruding from the container. Furthermore, a device 13 for moving the tower 2 is shown at the top of the substructure 1. This device 13 for moving the tower 2 in this embodiment is a winch 13 for hoisting the tower 2.

Figure 2:
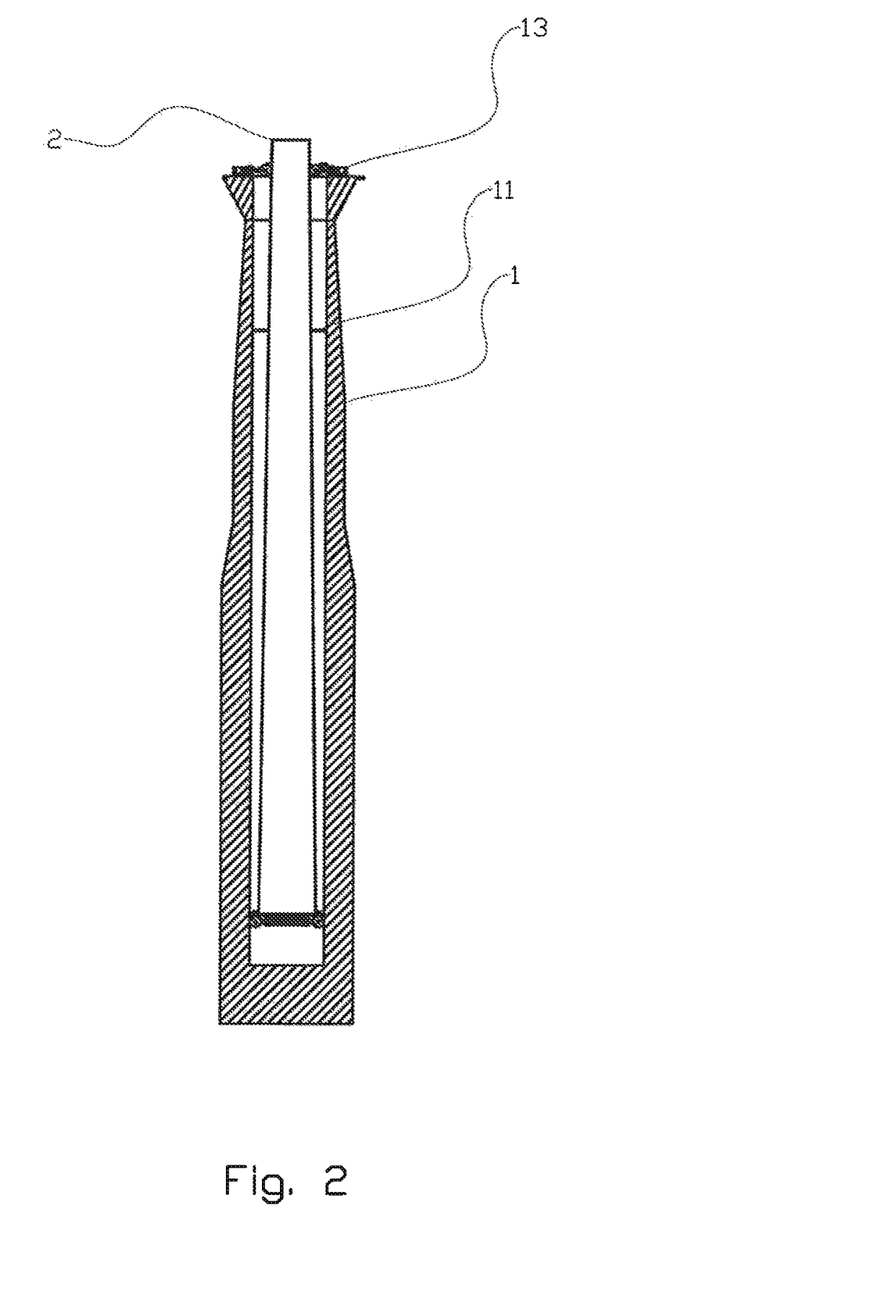
FIG. 2 shows a cross-sectional view of an embodiment of the substructure.

In FIG. 2, there is shown a substructure 1 where the depth of the container 11 is substantially equal to the height of the tower 2, such that the tower 2 can fit substantially in its entirety, in full length, in the container 11. Thus, there is no need to fold or retract or otherwise compress the length of the tower 2 to fit it substantially in its entirety in the container 11 of the substructure 1.

Figure 3:
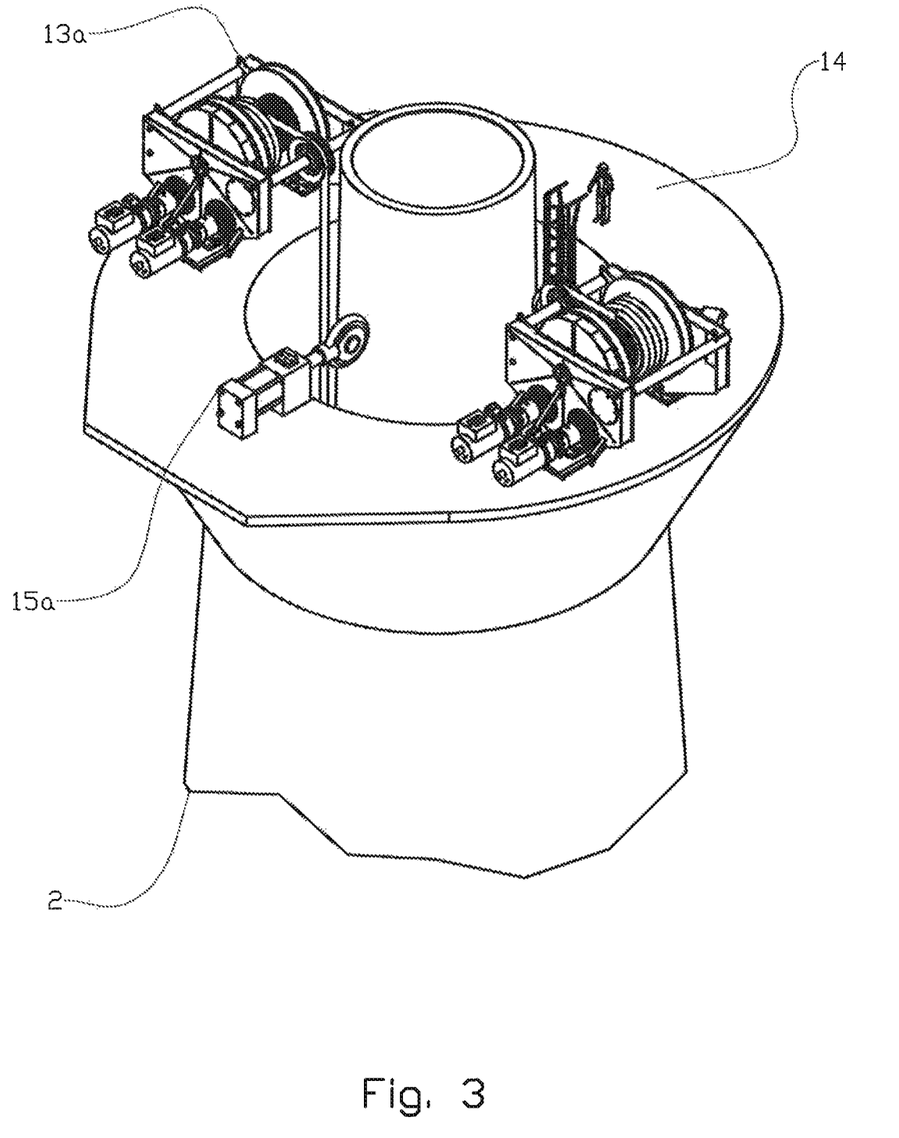
FIG. 3 show a perspective view of the top of an embodiment of the substructure.

The tower 2 can be moved longitudinally by use of the device 13 for moving the tower 2. This device 13 is shown in more detail in FIGS. 3 and 4. In FIG. 3, the top of the substructure 1 is shown, having a top surface 14. On the top surface there is shown a winch 13a for the device 13 for moving the tower 2 longitudinally. Furthermore, FIG. 3 also shows a guiding means 15a in the form of a roller 15a.

Figure 4:
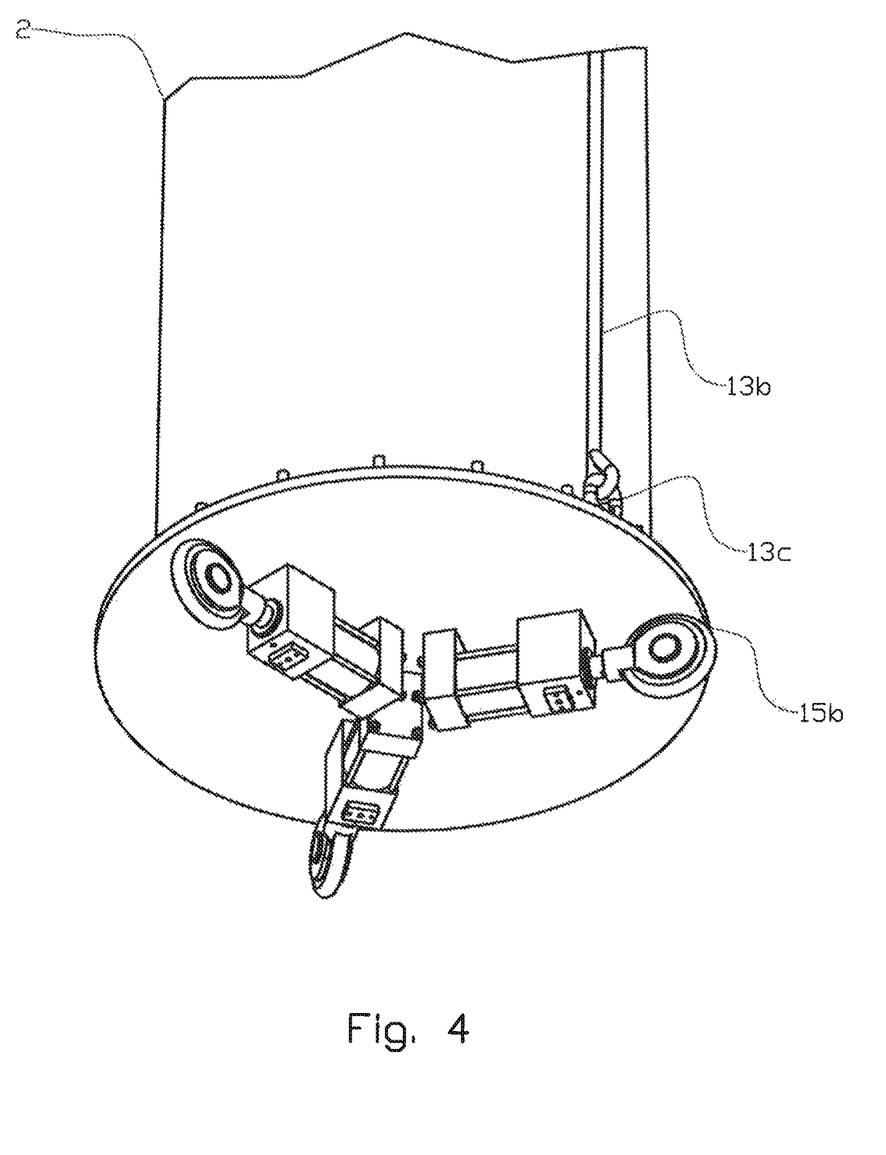
FIG. 4 shows a perspective view of the bottom of an embodiment of the tower.

FIG. 4 shows the bottom of the tower 2. The bottom of the tower 2 in this embodiment, is arranged with a guiding means 15b in the form of a roller 15b. It is further arranged with a fastening means 13c for connecting the tower 2 to the winch 13a (not shown in FIG. 4) via a wire 13b. The winch 13 can be used to lower or raise the tower 2.

The guiding means 15a, 15b are used to support the tower in the container. As the tower 2 is of uneven radius along its length, to provide sufficient guiding support for the tower 2, the guiding means 15a are capable of geometric adaption. In the embodiment shown in FIG. 3, the guiding means 15a attached to the top of the substructure 1 are telescopic. Geometric adaption is not needed for the guiding means 15b shown in FIG. 4, as they are fixed to the tower 2.

Figure 5:
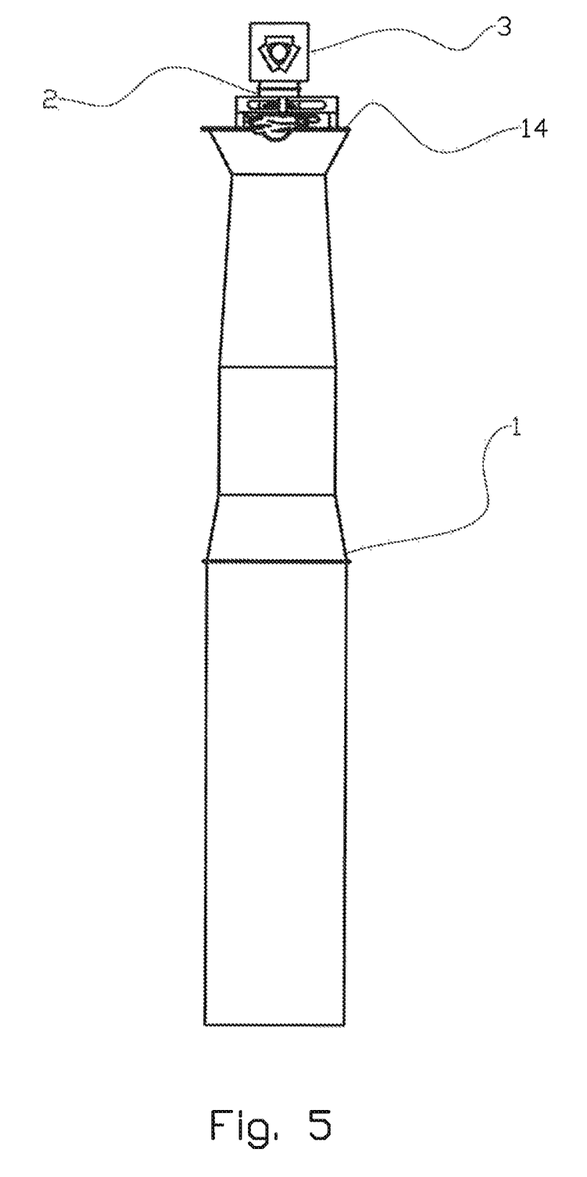
FIG. 5 shows a front view of an embodiment of the substructure with an upper section of the tower protruding from the upper end of the container, with a nacelle having been installed onto the upper section of the tower.

FIG. 5 shows a nacelle 3 having been installed to the top of the tower 2, with the top of the tower protruding from the top surface 14 of the substructure 1. In this embodiment, the top approximately two metres of the tower 2 protrudes from the container. An installation of the nacelle 3 at a height of two metres above an upper surface of the substructure is highly advantageous compared to an installation at full height of the tower 2. It demands less in terms of equipment, such as a crane and a vessel, and is less complex with regards to relative movement between a vessel and the substructure 1.

Figure 6:
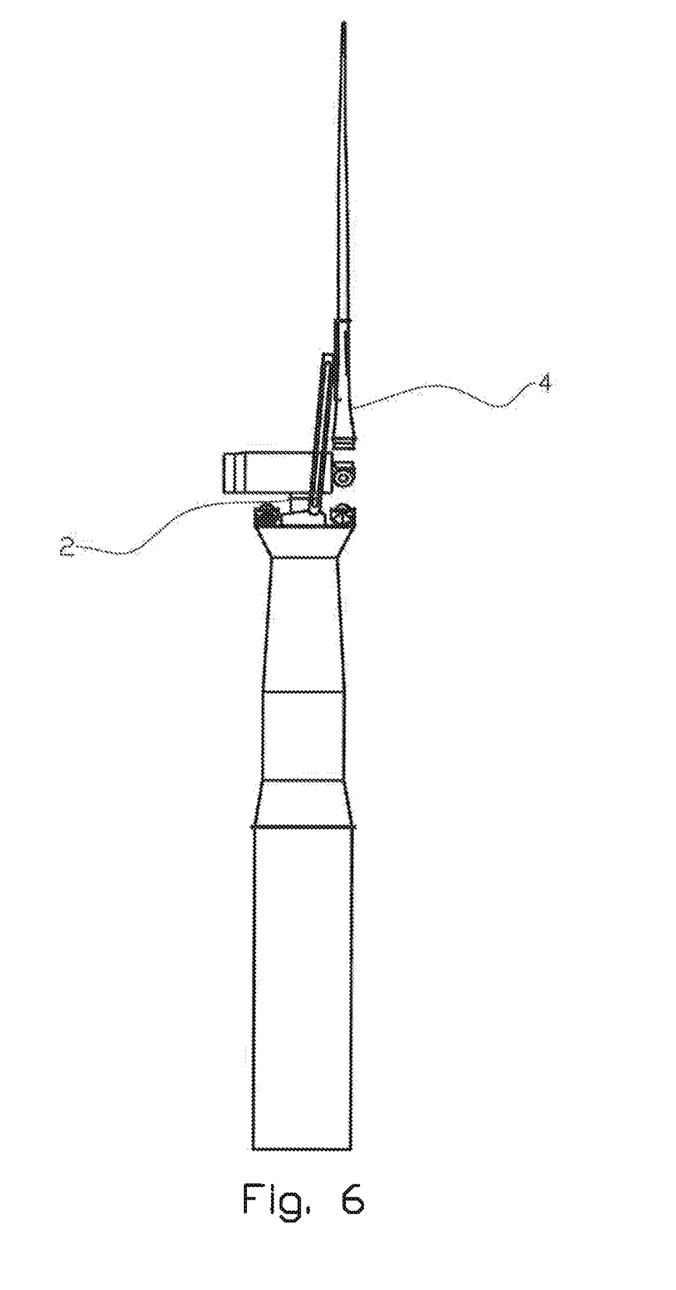
FIG. 6 shows a side view of an embodiment of the substructure with a nacelle and with a first blade having been installed, with the tower in a lowermost position.

In FIG. 6, a first blade 4 has been installed to the tower 2. In this embodiment, the blade 4 is installed in an upright position. The installation of the first blade 4 may be performed having the blade point in any direction. The blade 4 may be turned from one position to another prior to subsequent installation of further blades. FIG. 6 further shows that the blade 4 is installed with the tower 2 in its lowermost position.

Figure 7:
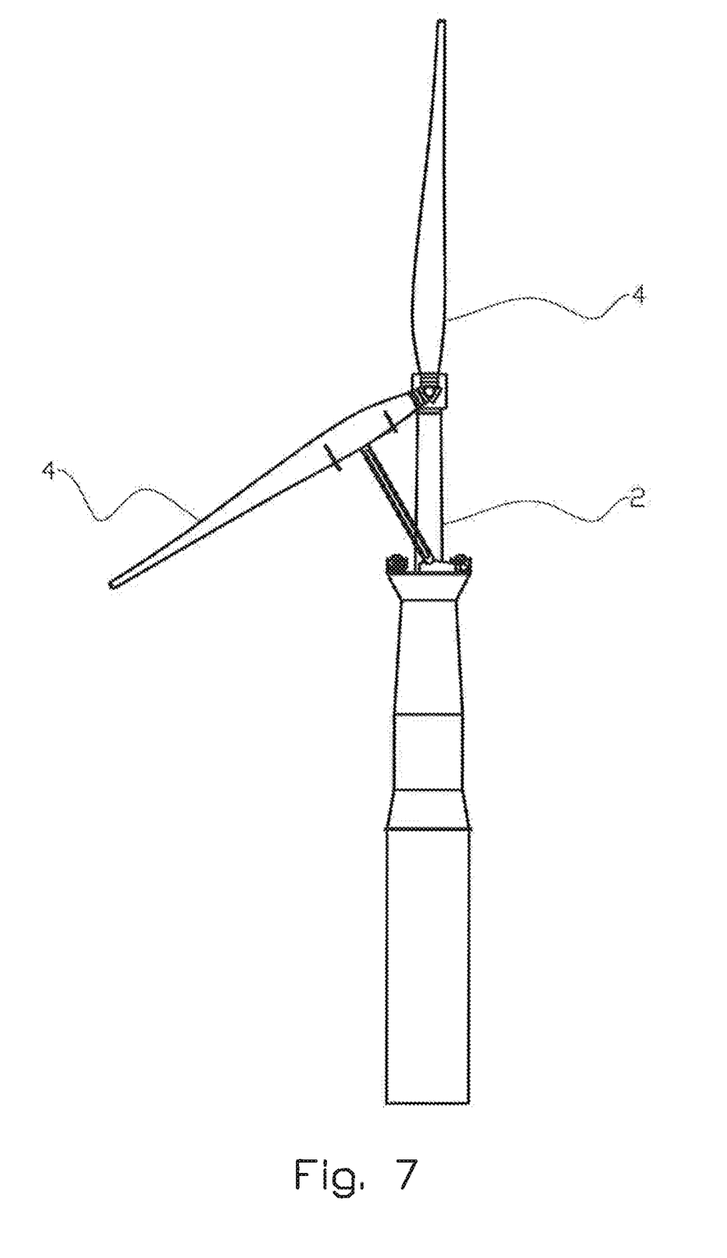
FIG. 7 shows a front view of an embodiment of the substructure with a nacelle and a first blade installed, as a second blade is being installed, with the tower in an intermediary position.

In FIG. 7, the tower 2 has been locked by use of a locking mechanism (not shown) in an intermediary position for installation of a second blade 4. The first blade 4, in this embodiment is still in an upright position, whereas the second blade 4 is installed inclined downwards.

Figure 8:
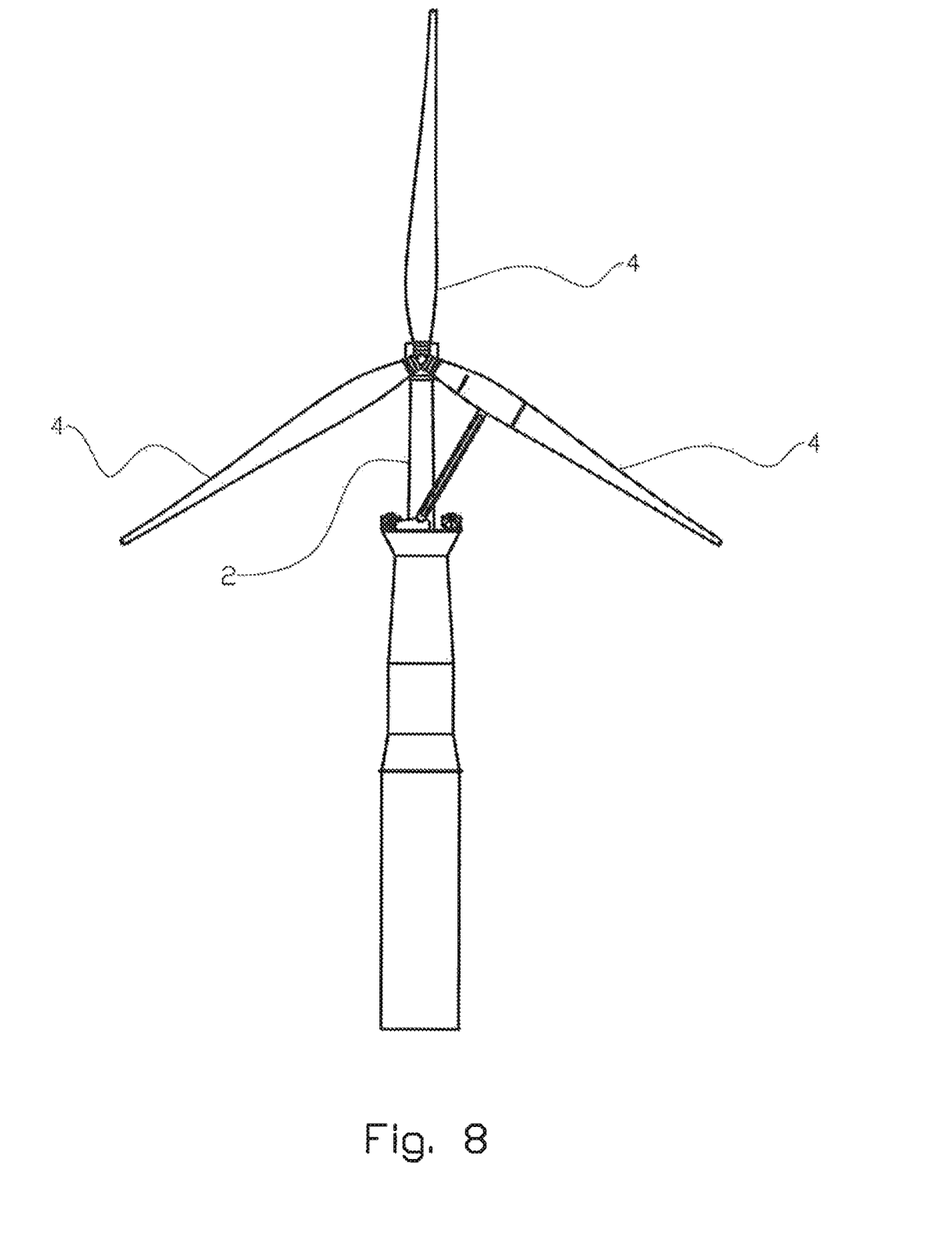
FIG. 8 shows a front view of an embodiment of the substructure as a third blade is being installed, with the tower in an intermediary position.

FIG. 8 shows a third blade 4 being installed, inclined downwards on an opposite side of the tower 2 relative to the second blade 4. The tower 2, in this embodiment, is still in the intermediary position for the installation of the third blade. In other embodiments, the tower 2 may e.g. be in its uppermost position for the installation of the second and/or third blade 4 or in the lowermost position for the installation of the second and/or third blade 4.

Figure 9:
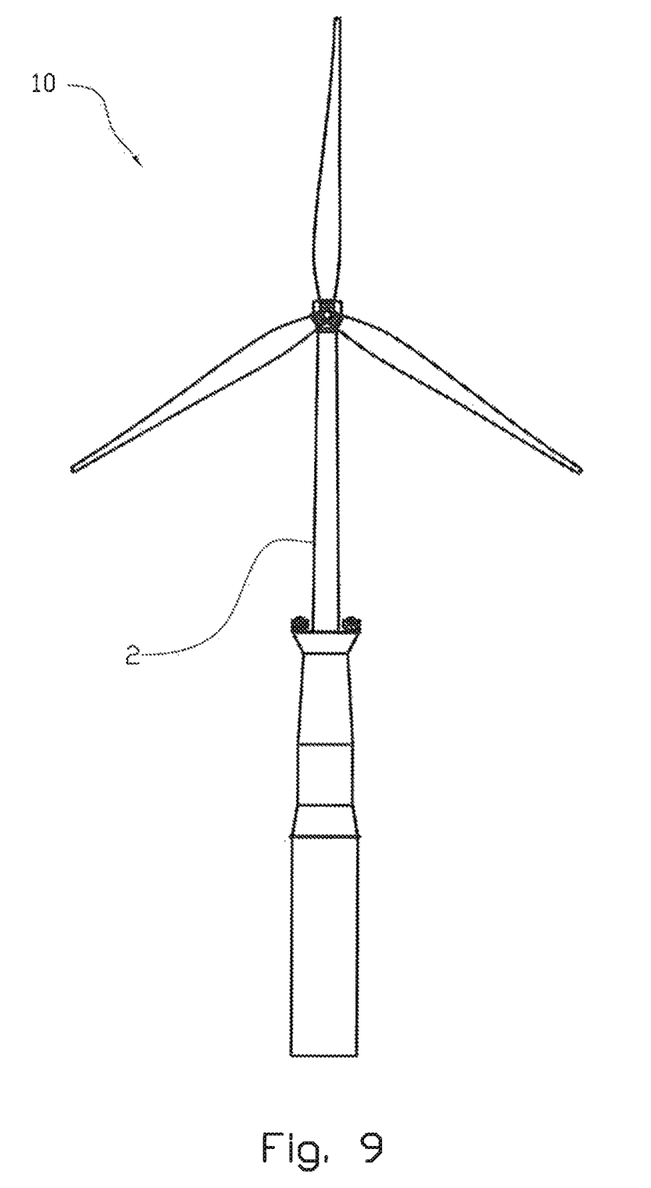
FIG. 9 shows a front view of an embodiment of the substructure with the tower in an uppermost position.

In FIG. 9, the tower 2 is shown in its uppermost position, with all three blades. At this point, the substructure with the tower 2, the nacelle 3 and the blades 4 installed, what is shown is a fully operational offshore wind turbine 10.

The substructure 1 according to the second aspect of the disclosure can enable the method of the first aspect of the disclosure. It may, however, be possible to perform the method using another type of substructure.

The Figures shows different steps of an installation of a wind turbine 10 and/or the wind turbine 10 at different stages of an installation.

A complete installation of the wind turbine 10 may involve several method steps, including one or more steps of the method according to the first aspect of the disclosure. One example of such an installation procedure is described below:

A substructure 1, in the form of a spar buoy, having an open container 11 for housing a tower 2 for an offshore wind turbine 10 is provided in a body of water laying with its longitudinal axis oriented substantially horizontally. The tower 2 is then provided into the body of water, with its longitudinal axis oriented substantially horizontally, and is floated into the container 11 of the substructure 1. When being floated into the container 11, the tower 2 is guided by guiding means 15a, 15b. Means for driving, pulling, pushing or otherwise physically moving the tower 2 into the chamber can be used.

The tower 2, when having been floated into and to the bottom of the container 11, being approximately two meters longer than the container 11, protrudes slightly from the container when in position in the container. A substructure 1 having a tower 2 housed in a container of the substructure and slightly protruding from the container is shown in FIG. 1.

When the tower 2 is in position and secured in the container 11, the substructure 1 is towed to a position at sea for installation of the wind turbine 10.

When the substructure 1 has been towed to the position for installation of the wind turbine 10, it is upended by ballasting, so as to orient the longitudinal axis vertically. The tower 2 protrudes from the container 11 of the substructure 1 and is thus ready for installation of a nacelle 3 onto the tower 2.

The nacelle 3 and three blades are carried to the position for installation by a vessel. The substructure 1, in this example, has a tiltable frame for carrying equipment from the vessel. This frame was installed onto the substructure 1 prior to towing the substructure 1 to the position at sea. By use of the frame, the nacelle 3 is carried from the vessel and onto the substructure for installation onto the tower 2.

When the nacelle 3 has been installed, as seen in FIG. 5, the blades can be installed. Two blades are then installed with the tower 2 kept at the same height as when the nacelle 3 is installed. The tower 2 is then raised to an intermediary position prior to installation of the third blade. When the blades have been installed, the tower is raised into its uppermost position, and the wind turbine 10 made ready for turning wind energy into electrical energy.

Note that what is described is an example of an installation, and that the method according to the invention that is claimed below may include only one or a few of the steps, and/or alternatives to many of the steps laid out above.

It should be noted that the above-mentioned embodiments illustrate rather than limit the claimed invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method of installing an offshore wind turbine, the method comprising the step of:
   raising a full-length tower for the offshore wind turbine by moving it longitudinally from a container in a floating substructure comprising a load-carrying device, the floating substructure being a support structure for the wind turbine; and
   lifting equipment by the load-carrying device from a vessel to the floating substructure.

2. The method according to claim 1, wherein the method comprises the step of installing a nacelle and one or more blades to the top of the tower, wherein the step of installing the nacelle and the one or more blades is performed prior to fully raising the tower.

3. The method according to claim 2, wherein the method further comprises the step of bringing the tower into an intermediary position by moving it longitudinally from a lowermost position prior to the installation of one or more of the nacelle and a blade.

4. The method according to claim 1, wherein the method further comprises the step of locking the tower into a position by use of a locking mechanism, wherein said position may be a lowermost position, an uppermost position or an intermediary position, wherein the intermediary position is a position between the lowermost position and the uppermost position.

5. The method according to claim 1, wherein the substructure is a floating substructure.

6. The method according to claim 1, wherein the substructure has a substantially vertical longitudinal axis when the substructure is upright, in its operational position.

7. The method according to claim 1, wherein the substructure is a spar buoy.

8. The method according to claim 1, wherein the substructure comprises a load-carrying device, and wherein the method comprises the step of lifting equipment by use of the load-carrying device from a vessel to the substructure.

9. The method according to claim 1, wherein the method comprises the step of upending the substructure prior to raising the tower.

10. The method according to claim 9, wherein the step of upending comprises ballasting.

11. A floating substructure for an offshore wind turbine, wherein:
    the substructure is arranged with a container configured for housing a tower for the wind turbine substantially in its entirety;
    the floating substructure comprises a support structure for the floating offshore wind turbine; and
    the floating substructure comprises a load-carrying device for carrying a load from a vessel to the floating substructure.

12. The substructure according to claim 11, wherein the substructure comprises a substantially vertical longitudinal axis when the substructure is in its upright, operational position, and wherein the container:
    comprises a substantially cylinder-shape; and
    comprises a longitudinal axis parallel and aligned with the longitudinal axis of the substructure.

13. The substructure according to claim 11, wherein the substructure is a spar buoy.

14. The substructure according to claim 11, wherein the substructure comprises a device for moving the tower longitudinally.

15. The substructure according to claim 14, wherein the device for moving the tower is a jacking device, a hoisting device, a pulling device, a driving device or a pushing device.

16. The substructure according to claim 11, wherein the substructure comprises a guiding means, for guiding the tower while moving the tower longitudinally.

17. The substructure according to claim 11, wherein the substructure comprises a compartment for ballast.

18. The substructure according to claim 17, wherein the substructure is configured to be transportable when its longitudinal axis is substantially horizontal and to be upendable by ballasting.

19. The substructure according to claim 11, wherein the substructure comprises a locking mechanism for locking the tower into a position.

20. The substructure according to claim 11, wherein the substructure comprises a guiding means for guiding the tower in the container as the tower is moved longitudinally.

21. The substructure according to claim 20, wherein the guiding means comprises one or more of a roller, a gliding plate, and a belt.

22. The substructure according to claim 20, wherein the guiding means is configured to guide a moving structure of varying diameter.

23. The substructure according to claim 22, wherein the guiding means is configured to support a moving structure of varying diameter.

24. The substructure according to claim 20, wherein at least one guiding means is attached to a wall of the container in the substructure and/or wherein at least one guiding means is attached to the tower.

25. The substructure according to claim 20, wherein at least one guiding means is attached to a top portion of a wall of the container in the sub-structure and/or wherein at least one guiding means is attached to a lower portion of the tower.

* * * * *